United States Patent [19]

Burrus

[11] 4,266,785
[45] May 12, 1981

[54] STYLUS LIFTING/LOWERING ACTUATOR WITH IMPROVED ELECTROMAGNETIC MOTOR

[75] Inventor: Thomas W. Burrus, Cedar Rapids, Iowa

[73] Assignee: RCA Corporation, New York, N.Y.

[21] Appl. No.: 98,359

[22] Filed: Nov. 28, 1979

[51] Int. Cl.³ .............................................. G11B 3/10
[52] U.S. Cl. .................................... 369/216; 369/224
[58] Field of Search .......................... 274/23 R, 23 A; 358/128.5; 179/100.4 R

[56] References Cited

U.S. PATENT DOCUMENTS

| 3,952,145 | 4/1976 | Allen | 274/23 R X |
| 3,972,533 | 8/1976 | Huff | 274/23 R |
| 4,030,124 | 6/1977 | Allen | 358/128 |
| 4,053,161 | 10/1977 | Bleazey et al. | 274/23 R |
| 4,059,277 | 11/1977 | DeStehanis | 274/23 A |

Primary Examiner—Harry N. Haroian
Attorney, Agent, or Firm—E. M. Whitacre; J. S. Tripoli

[57] ABSTRACT

A playback system for recovering prerecorded information from a disc record through the use of a stylus mounted on a stylus arm includes a stylus arm lifting-lowering device. The lifting-lowering device uses a permanent magnet mounted on a leaf spring. The permanent magnet is arranged to normally occupy the central volume of a core with a coil wrapped around the core. The leaf spring has an extension to receive the stylus arm. When an appropriate control signal is applied to the coil, a magnetic field is generated which tends to repell the magnet out of the central volume and the stylus arm, which rests on the extension, is gently lowered toward the record.

8 Claims, 5 Drawing Figures

STYLUS LIFTING/LOWERING ACTUATOR WITH IMPROVED ELECTROMAGNETIC MOTOR

The present invention relates generally to electromagnetic apparatus, and, more particularly, relates to electromagnetic apparatus suitable for use in a video disc player for lowering and lifting an arm, carrying a stylus at one end thereof, relative to a video disc record.

In certain video disc systems, video information is recorded by means of geometric variations contained in an information track on a disc record. In capacitive type systems the information is recovered by permitting engagement of the information track with a stylus. The stylus, typically, has a conductive electrode which together with conductive properties of the record forms a capacitance which varies in accordance with the recorded information, corresponding to the geometric variations, when relative motion is established between the stylus and the record. The capacitance variations are converted to electrical signals by suitable circuitry.

In such systems, the stylus is generally affixed at one end of a stylus arm. The other end of the stylus arm is compliantly coupled to a support member such as a cartridge which is placed in a carriage. The carriage is made to traverse a path laterally over the record in a timed relationship to the rotation of the record. The compliant coupling of the stylus arm allows the stylus to pass through an opening in the bottom of the carriage to permit stylus/record engagement during playback.

In such systems, the stylus arm is usually made from a very thin elongated member. In addition, the geometric variations which correspond to the recorded information have depths in the track on the order of a fraction of a micron. The stylus/record system is, as a result of these factors, fragile.

A problem which has been encountered in such systems is damage to the information track when the stylus is let down onto the record and lifted up from the record. Video disc systems of this nature require gentle lowering and lifting of the stylus in order to avoid, or at least minimize, such damage. The stylus should not be suddenly dropped down onto a record which is already being rotated. In addition, the stylus should not be suddenly jerked off the record during the lifting operation. Since the stylus is supported on a long thin member, a sudden lift may cause an oscillatory motion of the stylus end of the arm whereupon pecking damage to the record could result.

In order to avoid damage to the record, and possibly the stylus, during lifting and lowering operations, it is desirable to provide apparatus which will smoothly and reliably perform these lifting and lowering operations.

The present invention provides an electromagnetic stylus lowering/lifting apparatus which is arranged to gently and smoothly lower and lift the stylus arm.

The present invention is embodied in a playback system for recovering prerecorded information from a record rotatably supported on a turntable. The system includes a support member and a stylus arm having a pickup stylus mounted at one end of the arm. The other end of the arm is pivotally secured to the support member. In accordance with the present invention, there is provided a leaf spring, which normally lies in a plane substantially parallel to the turntable. One end of the leaf spring is fixedly secured. A stylus arm rest is attached to the leaf spring in the vicinity of the other end of the leaf spring and is adapted to receive the stylus arm. A permanent magnet is mounted on the leaf spring extending along a line generally perpendicular to the turntable. An assembly is provided which comprises a coil wound around a core with the core defining a central volume forming an air gap. The assembly also has a pair of terminals connected to the coil. The assembly is mounted relative to the leaf spring and permanent magnet such that the permanent magnet is substantially within the central volume and normally occupies a portion of the air gap. An energizing means is connected to the pair of terminals for selectively causing current to flow through the coil to selectively establish a given magnetic field in the air gap. The permanent magnet is repelled away from the air gap when the energizing means is operated. The travel of the magnet on the leaf spring is such that stylus/record contact is made.

IN THE DRAWING

Figure 1:
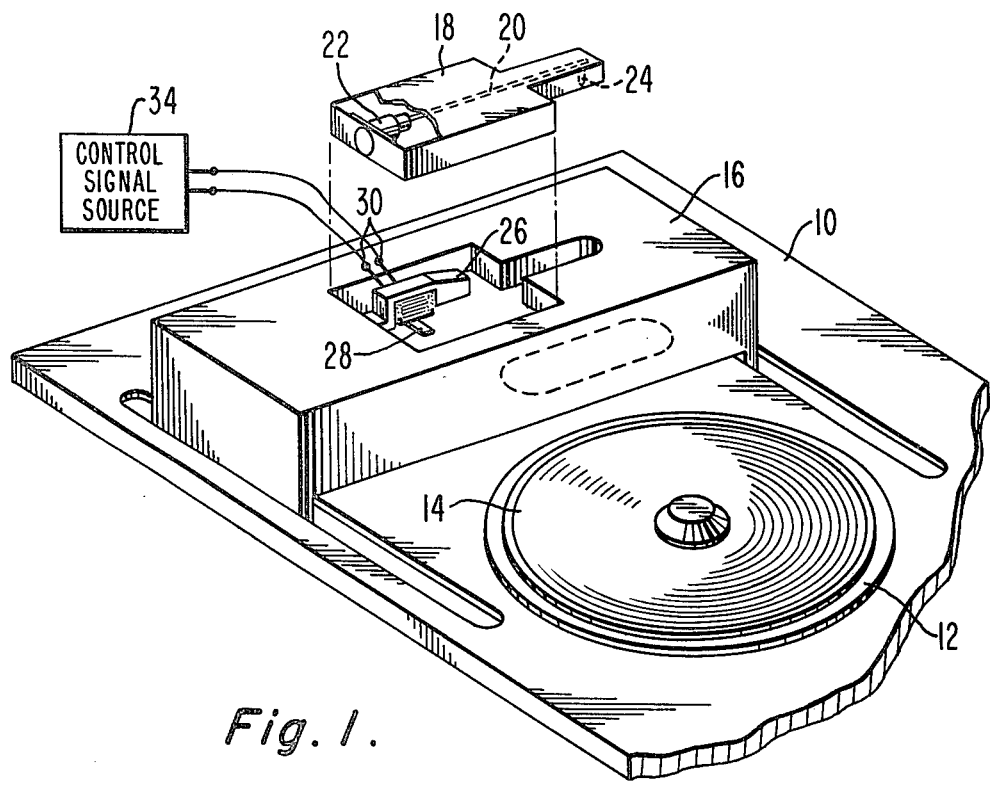
FIG. 1 is a diagrammatic sketch of a video disc player showing the lifting-lowering mechanism of the present invention positioned in a carriage assembly.

Referring now to FIG. 1, a portion of a video disc player is shown comprising a base 10, a rotatable turntable 12 for supporting a video disc record 14, and a carriage 16. The carriage 16 is arranged to travel on guides or rails (not shown) below the base 10 in a timed relationship to the rotation of record 14. Carriage 16 moves laterally to traverse the record along a radial line of turntable 12.

Carriage 16 is provided with an opening in the upper surface to receive a cartridge 18. Cartridge 18 includes a pickup arm 20 which is compliantly connected, via compliant coupler 22, on one end, and, carries the stylus 24 which comprises a diamond tip having an electrode deposited thereon at the other end of the stylus arm. Coupling 22 has enough compliance to permit the arm 20 to move up and down as well as side to side during playback when the cartridge 18 is inserted in the player carriage 16.

Through the opening on the top surface of the carriage 16, there is shown a stylus lifting-lowering device 26. This device is adapted to be secured to the carriage so that in the event of a stylus replacement, the lifting-lowering device need not be replaced.

When the cartridge 18 is positioned in the carriage 16, the stylus arm 20 will come to rest (in the above record position) on the extension 28 of the device 26. The device 26 also includes a pair of terminals 30 which are electrically connected to a coil 32 in the device 26. Terminals 30 are adapted for connection to an energization means including a control signal source 34. Source 34 provides a particular form of signal to the device 26 and will be discussed in more detail herein.

Figure 2:
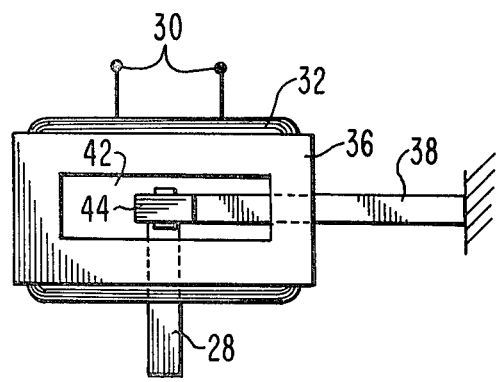
FIG. 2 is a top view of a portion of the lifting-lowering assembly of FIG. 1.

FIG. 2 shows a top view of a portion of the lifting-lowering device 26. The coil 32 is wound about a nonmagnetic core 36 which may be formed from a plastic material. Also shown in FIG. 2 is a leaf spring having a first portion 38 which is fixed or secured at one end. The leaf spring has an extension 28 which serves as the stylus arm rest and is adapted to receive the arm 20 when the cartridge 18 is inserted in the carriage 16.

The core 36 defines an enclosed central volume 42 which forms an air gap. The air gap or volume 42 is open at the top and bottom of core 36. Fixedly attached to the first portion 38 of the leaf spring at the junction of portion 38 and extension 28 is a permanent magnet 44.

Magnet 44 extends up from portion 38 into the central volume or air gap 42. In the normal condition, i.e. without a signal applied to terminals 30, the strength of the leaf spring is sufficient to support the magnet 44 in the central volume 42. That is, the leaf spring normally lies in a plane substantially parallel to the turntable 12. The height of magnet 44 extending up the central volume 42 is approximately one-half the central volume 42 height. The dimension of magnet 44 relative to the dimensions of the core 36 are selected such that magnet 44 will clear the core 36 when an appropriate signal is applied to terminals 30 and magnet 44 is repelled out of the air gap on an arc having a radius substantially equal to the length of portion 38 of the leaf spring.

Figure 3:
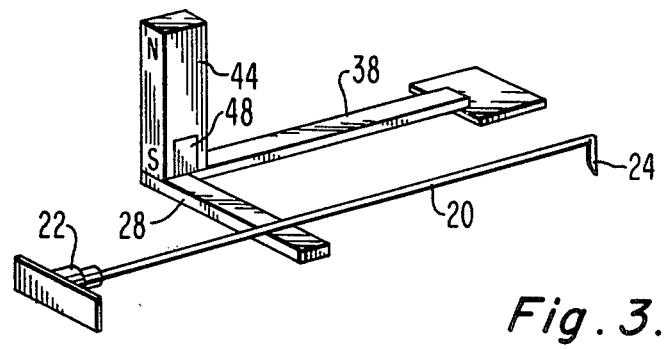
FIG. 3 is a sketch of a portion of the lifting-lowering assembly of FIG. 2.

FIG. 3 shows the mounting of magnet 44 on the leaf spring. Again, one end of portion 38 is fixed and the end where magnet 44 is located is free to move. As shown, magnet 44 is polarized to have a north pole at the top and a south pole at the bottom. Magnet 44 is held in place by tabs 48 extending up the length of the magnet on two sides for a short distance. When the cartridge 18 is placed in the carriage 16, the stylus arm 20 rests on the extension 28. Upon the application of an appropriate control signal, magnet 44 is repelled away from the air gap 42, in a direction toward the turntable 12, and, arm 20 is thus lowered onto the record 14.

Figure 4:
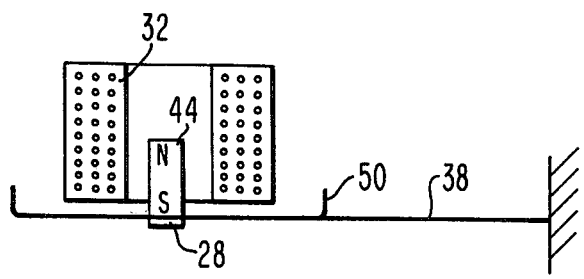
FIG. 4 is a sketch of another embodiment of the lifting-lowering assembly in accordance with the present invention.

FIG. 4 shows another embodiment wherein a soft steel base 50 is placed on the leaf spring. Base 50 is made to have at least two edges which curl up and extend a short distance compared to the height of coil 32. It is believed that the soft steel base 50, which functions as a wrap around pole piece, alters the magnetic field, generated when a signal is applied to terminals 30, such that the flux lines in the air gap 42 tend to have a greater density in the vicinity of the magnet 44. The repulsive force of the lifting-lowering mechanism 26 may be increased by use of base 50. That is, greater efficiency, especially with the less powerfull Alnico magnets, may be achieved. The pole piece formed by base 50 does add weight to the leaf spring and this may require a stiffer spring to hold the magnet 44 in place in the central volume 42 in the absence of energization. In actual practice, assemblies have been constructed with and without pole piece 50 and both arrangements appear to function in an acceptable manner. The preferred assembly is the one shown in FIGS. 2 and 3.

Figure 5:
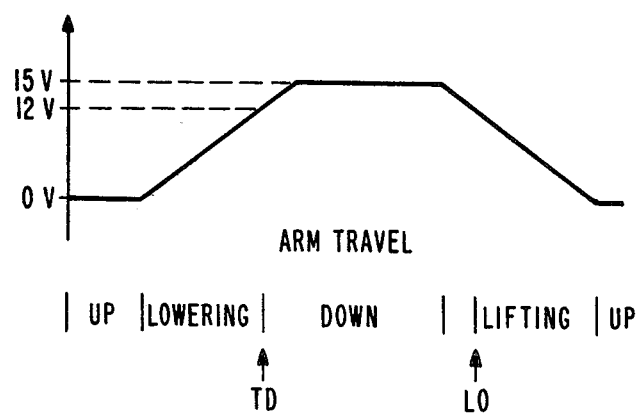
FIG. 5 is a representation of the voltage versus arm travel waveform which may be used with the present invention.

FIG. 5 shows an idealized curve of voltage applied to terminals 30 versus stylus arm travel. Initially, with no voltage applied, the arm 20 is resting on the extension 28 well above the record 12. As the voltage increases, the magnetic field builds in the air gap 42 and the magnet 44 is repelled (slowly and gently) out of the air gap 42. As this happens, the arm 20, still resting on extension 28, is slowly lowered toward the surface of the record 14. At the idealized 12 volt position on the curve, the stylus has touched down (TD) on the record 14. At this time, the leaf spring has a defined curvature as its free portion is arced toward the record. It is desirable to make the arm rest extension 28 go down toward the record even further, so that the stylus arm 20 is disengaged from extension 28 so that the arm is free to move in all directions permitted by the system without interference from the lifting-lowering assembly 26. To do this, the control signal is made to go to the 15 volt level and is held at this level throughout the disc playback sequence. When it is desired to lift the stylus 24 from the record 14, the control signal is reduced in a controlled fashion. As the curve goes through the idealized 12 volt level, the extension 28 comes into contact with the arm 20 and the stylus is lifted off (LO) the record. The process continues until the magnet 44 is returned to its initial position in the air gap 42.

In the particular arrangement of assembly 26, the repulsive magnetic force is nearly independent of the position of magnet 44 in the air gap 42 for a given level of coil excitation. The repulsive force at any given excitation level is proportional to the rate of change of magnetic flux linking the coil with magnet displacement. This rate of change is fairly constant for a wide range of excitation levels as a result of the arrangement of the assembly as a whole. This is a desirable property for a stylus lifting-lowering mechanism. This relatively constant repulsive magnetic force accounts for the smooth operation of the device within a given range of excitation levels. If, however, the coil 32 is overexcited, the magnet 44 may be forced all the way out of the air gap 42, thereby reducing the rate of change of coil linking flux and thereby reducing the magnetic repulsive force. Thus, it is desirable to operate the present device within a range of excitation levels which will maintain a certain rate of change of coil linking flux with displacement in order to maintain the repulsion force at a reasonably constant level.

Although it is possible to overexcite the coil 32 and drive the magnet 44 clear of the air gap and hold it in that position, it is undesirable to do so since excessive coil heating may result.

It should also be noted that the entire lifting-lowering assembly 26 is arranged such that in the event of loss of power to the player, the spring force of the leaf spring is effective to lift the stylus arm 20 off the record. This is a desirable feature since it could be harmful to have the stylus on the record when power is lost and it could be even more harmful should the power suddenly come on again.

In practice of the present invention it has been found that permanent magnet 44 may be made from samarium cobalt. This material works well but is relatively expensive. Another more economical material for magnet 44 which has been used and works reasonably well is Alnico V. This material is less expensive than samarium cobalt and is preferred from the economical point of view.

Thus, the present invention provides a small economical device utilizing electromagnetic principles for gently lowering and lifting a stylus arm onto and off a record rotatably mounted on a turntable.

What is claimed is:

1. In a playback system for recovering prerecorded information from a record, said record being rotatably supported on a turntable, said system including: a support member; and a stylus arm having a pickup stylus mounted at one end of said arm, said arm being pivotally secured at the other end to said support member; the apparatus comprising:

a leaf spring normally lying in a plane substantially parallel to said turntable, one end of said leaf spring being fixedly secured;

a stylus arm rest attached to the leaf spring in the vicinity of the other end of said leaf spring and adapted to receive said stylus arm;

a permanent magnet mounted on said leaf spring and extending along a line generally perpendicular to said turntable;

an assembly comprising a coil wound around a core, said core defining a central volume forming an air gap, said assembly having a pair of terminals connected to said coil; said assembly being mounted relative to said leaf spring and said permanent magnet such that said permanent magnet normally occupies a portion of said air gap whereby said permanent magnet is normally substantially within said central volume; and energizing means connected to said pair of terminals for selectively causing current to flow through said coil to selectively establish a magnetic field in said air gap;

the orientation of said permanent magnet relative to said air gap being such that said permanent magnet is repelled away from said air gap under the influence of said energizing means in a direction to permit stylus/record contact.

2. The apparatus according to claim 1 wherein said system further comprises a stylus arm carriage mounted for lateral motion with respect to said turntable and wherein said support member comprises a cartridge adapted to be received in said stylus arm carriage and wherein said leaf spring and said assembly are mounted on a base with said base being adapted for connection to said carriage.

3. The apparatus according to claim 1 wherein said permanent magnet is formed from samarium cobalt.

4. The apparatus according to claim 1 wherein said permanent magnet is formed from Alnico.

5. In a playback system for recovering prerecorded signals from a record, said record being rotatably supported on a turntable, said system including a support member and a stylus arm, said stylus arm having a pickup stylus mounted on one end and being pivotally secured to said support member at the other end; the apparatus comprising:

a leaf spring normally lying in a plane substantially parallel to said turntable, said leaf spring having a first portion lying substantially parallel to said stylus arm, one end of said first portion being fixedly secured, said leaf spring having a second portion extending from said first portion in a substantially perpendicular direction, said second portion being adapted to support said stylus arm;

a permanent magnet mounted on said leaf spring in the vicinity of the juncture between said first and second portions of said leaf spring, said permanent magnet being mounted along a line generally perpendicular to said turntable;

an assembly comprising a coil wound around a non-magnetic core, said core defining an enclosed central volume having openings on the top and bottom thereof to form an air gap; said assembly having a pair of terminals connected to said coil, said assembly being mounted relative to said leaf spring and said permanent magnet such that said permanent magnet normally occupies a portion of said air gap whereby said permanent magnet is normally substantially within said central volume; and energizing means connected to said pair of terminals for selectively causing current to flow through said coil to provide a magnetic field in said air gap;

the orientation of said permanent magnet relative to said magnetic field being such that said permanent magnet is repelled away from said air gap under the influence of said energizing means in a direction to permit stylus/record contact.

6. The apparatus according to claim 5 wherein said system further comprises a stylus arm carriage mounted for lateral motion with respect to said turntable and wherein said support member comprises a cartridge adapted to be received in said stylus arm carriage and wherein said leaf spring and said assembly are mounted on a base with said base being adapted for connection to said carriage.

7. The apparatus according to claim 5 wherein said permanent magnet is formed from samarium cobalt.

8. The apparatus according to claim 5 wherein said permanent magnet is formed from Alnico.

* * * * *